United States Patent
Poutievski et al.

(10) Patent No.: US 9,253,117 B1
(45) Date of Patent: Feb. 2, 2016

(54) SYSTEMS AND METHODS FOR REDUCING NETWORK HARDWARE OF A CENTRALLY-CONTROLLED NETWORK USING IN-BAND NETWORK CONNECTIONS

(71) Applicant: Google Inc., Mountain View, CA (US)

(72) Inventors: Leon Poutievski, Santa Clara, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 332 days.

(21) Appl. No.: 13/718,638

(22) Filed: Dec. 18, 2012

(51) Int. Cl.
*H04L 12/933* (2013.01)
*H04L 12/24* (2006.01)
*H04L 12/751* (2013.01)
*H04L 12/26* (2006.01)

(52) U.S. Cl.
CPC ............. *H04L 49/15* (2013.01); *H04L 41/12* (2013.01); *H04L 43/10* (2013.01); *H04L 45/02* (2013.01); *H04L 43/04* (2013.01)

(58) Field of Classification Search
CPC ..... H04L 41/0823; H04L 47/10; H04L 49/20; H04L 41/12; H04L 43/10; H04L 45/02; H04L 49/15
USPC .......................................................... 709/224
See application file for complete search history.

(56) References Cited

U.S. PATENT DOCUMENTS

| 8,830,823 | B2 | 9/2014 | Koponen et al. |
| 2005/0149478 | A1 * | 7/2005 | Fahy ................................. 707/1 |
| 2006/0053276 | A1 * | 3/2006 | Lortz et al. .......................... 713/2 |
| 2007/0147318 | A1 * | 6/2007 | Ross et al. ..................... 370/338 |
| 2009/0161681 | A1 * | 6/2009 | Madrahalli et al. ........... 370/401 |
| 2011/0103259 | A1 * | 5/2011 | Aybay et al. ................... 370/254 |
| 2011/0317701 | A1 | 12/2011 | Yamato et al. |
| 2012/0281698 | A1 | 11/2012 | Forster et al. |
| 2013/0028070 | A1 | 1/2013 | Beheshti-Zavareh et al. |
| 2013/0028142 | A1 | 1/2013 | Beheshti-Zavareh et al. |
| 2013/0132531 | A1 | 5/2013 | Koponen et al. |
| 2013/0148498 | A1 | 6/2013 | Kean et al. |
| 2013/0223277 | A1 | 8/2013 | Decusatis et al. |
| 2013/0230047 | A1 | 9/2013 | Subrahmaniam et al. |

OTHER PUBLICATIONS

McKeown et al., "Open Flow: Enabling Innovation in Campus Networks", Mar. 14, 2008, Open Networking Foundation, pp. 1-6.
Notice of Allowance on U.S. Appl. No. 13/718,646 dated Nov. 12, 2014.
Office Action on U.S. Appl. No. 13/718,646 dated Aug. 6, 2014.

* cited by examiner

*Primary Examiner* — Kristie Shingles
(74) *Attorney, Agent, or Firm* — Edward A. Gordon; Foley & Lardner LLP

(57) ABSTRACT

A network topology system for reducing the hardware links in a centrally-controlled network having a plurality of network switches and a plurality of centralized controllers controlling those switches. The global network of switches and controllers is broken up into domains, wherein a domain contains a subset of controllers and switches, and a switch in a domain is controlled by one or more controllers. In-band hardware links, which carry both data and control information, are used to connect the controllers and switches in a domain, and thereby reduce the number of hardware links from that used in networks which have separate hardware links for both data and control information.

28 Claims, 5 Drawing Sheets

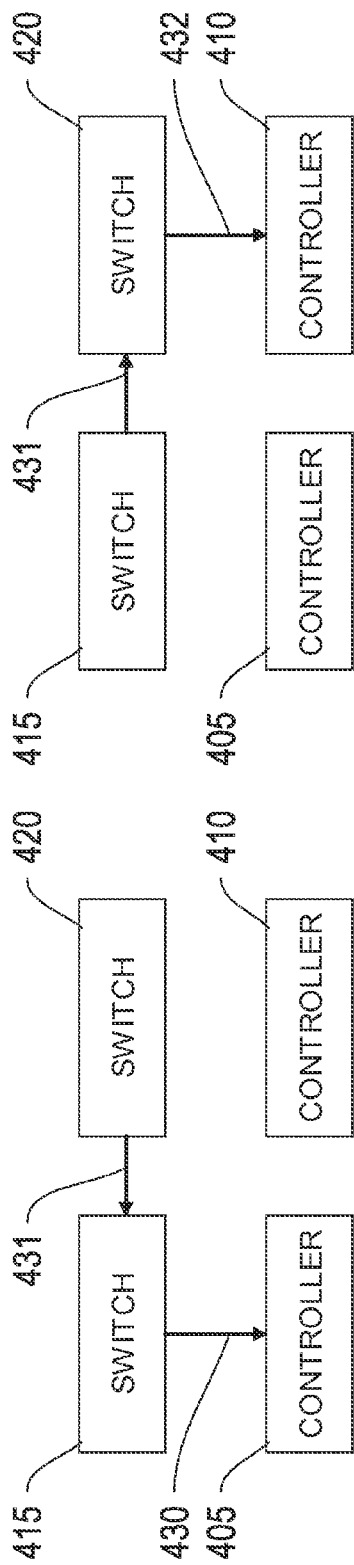
Fig. 4A
Fig. 4B
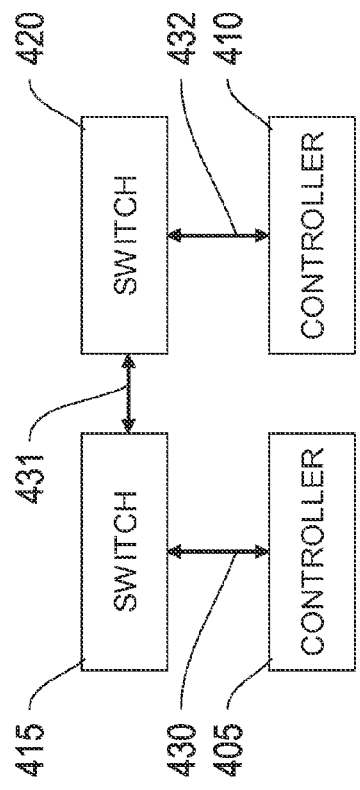
Fig. 4C

SYSTEMS AND METHODS FOR REDUCING NETWORK HARDWARE OF A CENTRALLY-CONTROLLED NETWORK USING IN-BAND NETWORK CONNECTIONS

TECHNICAL FIELD

The systems and methods described herein relate to network topology, and particularly, to the reduction of network infrastructure required to service a network with centralized control architecture.

BACKGROUND

A network system includes hardware, and supporting software, necessary to transmit information between computers. One can distinguish between a physical hardware link between two network nodes (computers, switches, routers, and controllers, among others), and a software connection, which refers to an established communication channel between nodes that allows transmitted information to be understood at both transmission and receiver ends. This is achieved by having a common routing policy, and implies that two nodes may be linked by hardware, but unable to connect or communicate until an initialization procedure has been carried out to establish a communication channel.

A link may refer to the physical hardware used to join network nodes, and a network may be a shared local area network (LAN), wide area network (WAN), metropolitan area network (MAN), the Internet, or any other type of network or communication system suitable for transferring information between computer systems. Ethernet is a common family of technologies using the IEEE standard 802.3 for local area networking (LAN), and Ethernet network hardware links (the physical layer) commonly use a Category 5 (Cat 5) twisted pair Ethernet cable. Alternative hardware link types include coaxial cables, twisted pair cables categorized in order of increasing bandwidth from category 1 to category 7, optical fiber cables, or any other conductor capable of facilitating communication between two network nodes. Hardware links make up a large amount of the total hardware required to implement a network. Reduction in the number of links is desirable from a number of standpoints, including; a capital cost savings in the setup of the network and replacement of cabling after failure, and, a reduction in the complexity associated with manually ensuring hardware links are connected correctly.

The operation of network nodes can be conceptually divided between a data-plane and a control-plane, wherein the data-plane comprises the physical hardware used to forward data packets through a piece of network hardware, and the control-plane comprises the software that analyzes data packets arriving at, for example, a switch port, and executes certain redirection processes in response to the data packet's arrival. The control-plane maintains a routing table, listing all network addresses reachable from the given switch, and instructs the data-plane as to how to forward the data packet.

A centrally-controlled network, otherwise referred to as a software-defined network, is a methodology that allows for centralized control of a network of nodes from a dedicated hardware server, referred to as a centralized controller. Alternatively, a network may implement logically-centralized control of nodes, wherein a logically-centralized controller may be implemented as distributed processes across multiple different central processing units (CPUs) in multiple servers. To implement centralized control, the control-plane is removed from individual switches and routers, and replaced by an OpenFlow agent, which allows for remote control from a global control plane (otherwise referred to as a centralized controller, or simply as a controller).

An OpenFlow switch is an example of a network node that is controlled from a centralized controller. An OpenFlow switch primarily consists of a flow table, which informs the switch as to how to process incoming packets, a secure channel that connects to the global control plane, and the OpenFlow protocol that enables a centralized controller to communicate with the switch. A centralized controller, by using the OpenFlow protocol, can remotely program switch flow tables, send packets on any switch port, and receive packets from any switch port. Methodology for centralized control is described by OpenFlow, at www.openflow.org.

The complexity and cost associated with the hardware links for establishing network connectivity represents a problem in a centrally-controlled network. Currently, the methods for establishing network connectivity in a centrally-controlled network include the following two examples.

A first method implements a separate control-plane network (CPN), with all switches and controllers connected to the CPN using out-of-band (OOB) hardware links such that there is a dedicated hardware link between a switch and a controller for control information, and separate hardware used to send data, where "data" refers to all information not used for network control. In contrast, an in-band (IB) connection sends both data and control information on the same hardware links. The drawback to the use of a CPN is the added cost associated with the construction and maintenance of the separate CPN. Furthermore, a separate CPN is likely to have substantially less redundancy than a data-plane network, due to the much larger number of hardware links required to service a data network. The methodology associated with a CPN can therefore be described as more prone to failure.

A second method for establishing network connectivity in a centrally-controlled network uses a hybrid model, where, in addition to the OpenFlow protocol, switches run a routing protocol (such as Open Shortest Path First (OSPF), or Intermediate System to Intermediate System (IS-IS)). The drawback associated with this methodology relates to the extra switch complexity and configuration that is required to run the protocol.

As such, there is a need for a more efficient method of implementing centralized control in a network and for reducing the network hardware required for the implementation.

SUMMARY

The systems and methods described herein include, among other things, a network topology system for reducing the hardware links in a centrally-controlled network.

In one aspect, a system is described as having a domain with a first and a second network node, controlled by a first centralized controller. In-band hardware links connect the network nodes and the centralized controller, and a probe processor is used to advertise the network address of the network nodes by communicating probe packets through the in-band hardware links. A initialization processor in the first centralized controller is used to receive the probe packets from the network nodes, and to set-up communication channels to the network nodes so that data and control information can be sent between the network nodes and the centralized controller using the in-band hardware links.

In another implementation, the system has a second centralized controller with a second initialization processor, for setting up communication to the first centralized controller through the in-band hardware links, wherein a network path between the first and the second centralized controllers may not be direct. The first and second initialization processors can construct probe packets that advertise the network addresses of the first and the second centralized controllers, transmit the probe packets, receive probe packets from the other respective centralized controller, and set-up a communication channel to the other respective centralized controller in response to receiving control packets.

In another implementation, the system may have a master controller which can control all other controllers and network nodes in a domain.

The system may designate one of the first or the second centralized controllers as the master controller, and the non-designated centralized controller is known as a secondary controller.

The system may further designate one of the first or the second centralized controllers as a master controller from default settings stored in both centralized controllers.

In another implementation, a network node in the system has an in-band control processor for differentiating between data and control information received through a single in-band hardware link.

The system may have a network node lookup table which maintains a list of the active network nodes in a domain.

In certain implementations, the system has a centralized controller lookup table in a controller, which stores a list of all the other active controllers in a domain.

In another implementation, the network nodes may be switches.

The network nodes may be routers.

The system may use cryptographic authentication to authenticate a connection made using the initialization processor.

The cryptographic authentication may be secure sockets layer (SSL) authentication.

The system, in another implementation, differentiates between data packets and control packets using the in-band control processor by looking at distinct type of service (ToS) bits in the packet header.

The system may also differentiate between data packets and control packets using the in-band control processor by sending control packets from a specific TCP port number to another specific TCP port number on the recipient.

In another aspect, the systems and methods described herein include a method for reducing the hardware links in a centrally-controlled network. The method achieves this by grouping a first and a second network node and a first controller into a domain, such that the controller in the domain can control both the first and second network nodes in the domain. Connecting the controllers and network nodes are in-band hardware links. The in-band hardware links carry both data and control information, and reduce the number of hardware links from that required in networks which have separate hardware links for both data and control information. The method further uses a first initialization processor in the first controller to set up the control and data connections, and a probe processor to advertise the network addresses of the network nodes by communicating probe packets through the in-band hardware links.

In another implementation, the method has a second centralized controller with a second initialization processor, for setting up communication to the first centralized controller through the in-band hardware links, wherein a network path between the first and the second centralized controllers may not be direct. The first and second initialization processors can construct probe packets that advertise the network addresses of the first and the second centralized controllers, transmit the probe packets, receive probe packets from the other respective centralized controllers, and set-up a communication channel to the other respective centralized controller in response to receiving control packets.

The method may designate one of the controllers in a domain to be a master controller, and a master controller can control all of the other controllers and all of the other switches in a domain.

In another implementation, the method stores a list of network nodes active in the domain in a network node lookup table in a centralized controller.

The method may also store a list of centralized controllers active in the domain in a centralized controller lookup table in a centralized controller.

The method may authenticate a connection set up by an initialization processor in a centralized controller by using a cryptographic protocol.

The cryptographic protocol used to authenticate a connection set up by an initialization processor may be secure sockets layer (SSL).

The method may differentiate between data and control information by looking at the type of service (ToS) bits in the header of a packet send on an in-band hardware link.

In another implementation, the method may differentiate between data and control information by sending control information from a specific TCP port number on a sender node to a specific TCP port number on a recipient node.

BRIEF DESCRIPTION OF THE DRAWINGS

The systems and methods described herein are set forth in the appended claims. However, for purpose of explanation, several embodiments are set forth in the following figures.

FIG. 4A-4C are pictorial representations of the establishment of inter-controller reachability;

DETAILED DESCRIPTION

In the following description, numerous details are set forth for purpose of explanation. However, one of ordinary skill in the art will realize that the embodiments described herein may be practiced without the use of these specific details and that these details are not essential to the systems and methods described herein and that the actual details and features of the systems and methods will vary depending upon the application being addressed. In other instances, well-known structures and devices are shown in block diagram form to not obscure the description with unnecessary detail.

The systems and methods described herein include, among other things, a network topology system for reducing the hardware links in a centrally-controlled network.

A centrally-controlled network consists of a plurality of network switches and a plurality of centralized controllers controlling those switches. A network of switches and controllers may be broken down into domains, wherein a domain contains a subset of the controllers and switches, and a switch in a domain may be controlled by one or more controllers. Connecting the controllers and switches are in-band (IB)

hardware links, which carry both data and control information, and thereby reduce the number of hardware links from that used in networks which have separate hardware links for both data and control information. A centralized controller has an initialization processor for setting up data connections and control connections between the centralized controller and the plurality of network switches. Data information and control information is combined on the in-band hardware links using an in-band control processor.

Figure 1:
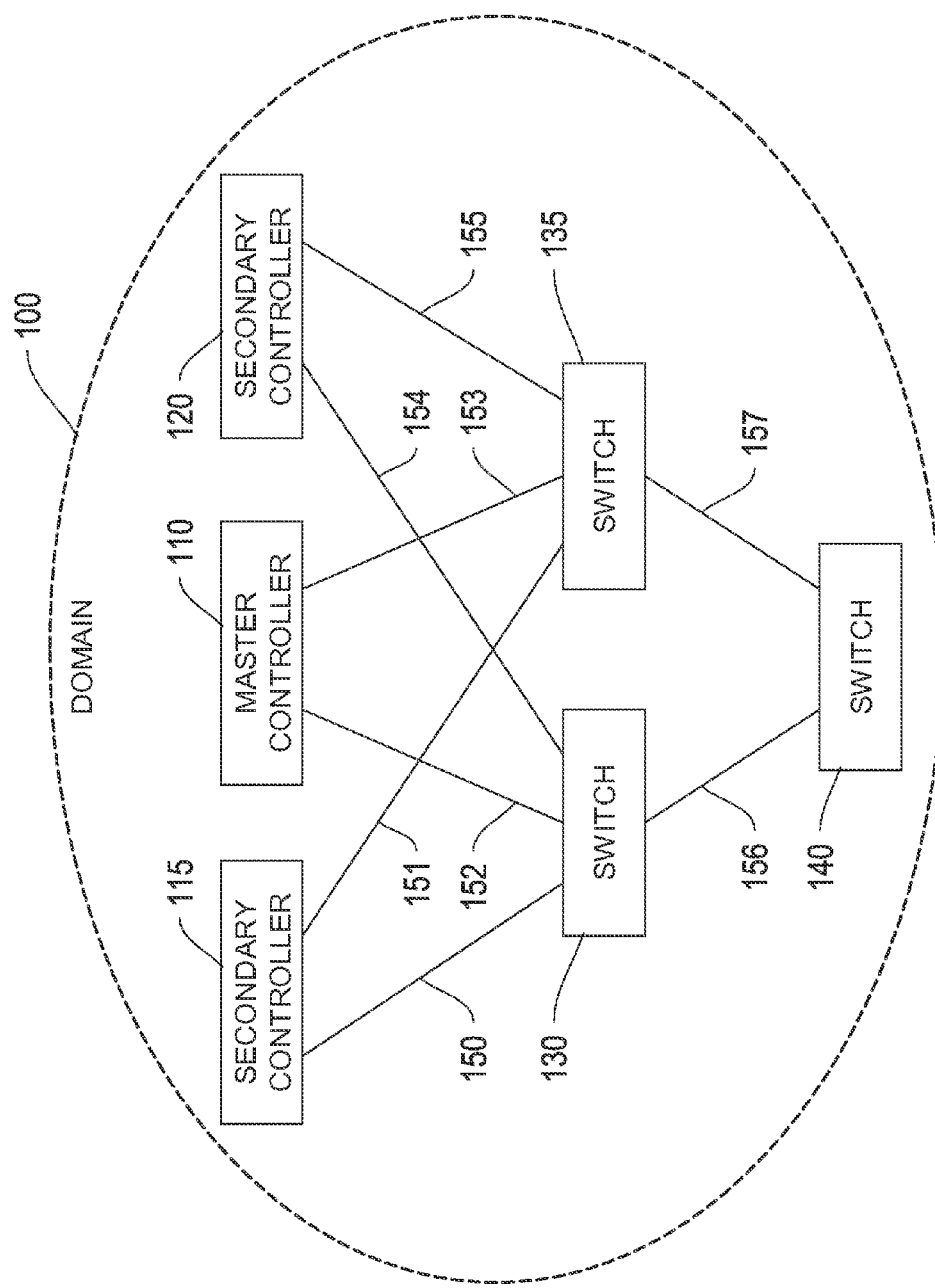
FIG. 1 is a schematic block diagram of a network domain of a centrally-controlled network environment which uses in-band hardware links exclusively, and in which some embodiments operate.

FIG. 1 is a schematic block diagram of a network domain in a centrally-controlled network environment which uses in-band hardware exclusively, and in which some embodiments operate. In particular, FIG. 1 depicts a domain 100, a master controller 110, two secondary controllers 115, 120, three switches 130, 135, 140, and in-band hardware links 150-157. The term "in-band", or "IB", refers to a software connection that allows both data information and control information to be communicated across a common hardware link, wherein the hardware link may be referred to as an in-band hardware link 150-157.

Control information may include, among others, a request from a switch (130, 135, or 140) to a centralized controller (110, 115, or 120), for instructions related to an unknown flow of data packets. The control information may also include instructions from a centralized controller (110, 115, or 120) to a network switch (130, 135, or 140) as to how to reprogram its on-board flow table, or information on the health of a network switch (130, 135, or 140) communicated to a centralized controller (110, 115, or 120). Data information, as opposed to control information, is the payload that is communicated between network nodes, such as switches (130, 135, and 140).

A "packet" is a package of information that is used on layer 3 of the OSI model, and communicated between routers or switches (130, 135, or 140). Switches (130, 135, or 140) may also operate on layer 2 of the OSI model, and communicate information in "frames", but the terms "frame" and "packet" may be used interchangeably in the following description, since a frame is an encapsulation of a packet.

The network hardware depicted in FIG. 1 is part of a larger network of routers, switches, controllers, and interconnecting hardware links. Domain 100 is defined as a subset of this larger network, and domain 100 may have, in some embodiments, greater than or fewer than the depicted three controllers 110, 115, 120, and three switches 130, 135, 140. Furthermore, a controller 110, 115, or 120 within the domain 100 can control one or more switches 130, 135, or 140.

Switch 130 is directly connected to secondary controller 115 by IB hardware link 150, directly connected to master controller 110 by IB hardware link 152, and directly connected to secondary controller 120 by IB hardware link 154. Similarly, switch 135 is directly connected to secondary controller 115 by IB hardware link 151, directly connected to master controller 110 by IB hardware link 153, and directly connected to secondary controller 120 by IB hardware link 155. Switch 140 is directly connected to switch 130 by IB hardware link 156, and to switch 135 by IB hardware link 157, such that the direct IB hardware links 156 and 157 may be used to communicate data information between switches.

Master controller 110, secondary controller 115, and secondary controller 120 may be implemented using similar hardware. The master controller 110, however, may execute a control process that can control secondary controllers 115 and 120, in addition to one or more of switches 130, 135, or 140. This control process may be executed by a CPU 265 associated with master controller 110, and save new instructions into the OpenFlow processor 250, on secondary controllers 115 and 120. These CPU 265 and OpenFlow processor 250 components are described further in relation to FIG. 2.

Upon establishing a communication channel between two controllers, such as controller 110 and controller 115, an initialization processor 220 in each controller 110 and 115 will communicate to designate one of the controllers 110 and 115 as the "master". In the exemplary embodiment of FIG. 1, controller 110 is designated as master controller 110.

The designation of a controller 110 as master controller 110 may result from controller 110 being powered on earlier than controller 115. The initialization processors 220 associated with controllers 110 and 115 may store timestamps of the time that the respective controllers 110 and 115 were powered on. In one implementation, the timestamp stored in initialization processor 220 of controller 110 is older than that of controller 115, and controller 110 is designated as master controller 110 by both the initialization processor 220 associated with controller 110 and the initialization processor associated with controller 115. In another implementation, controller 110 is designated as the master controller 110 due to a default value stored in the corresponding initialization processor 220 that is different to the default value stored in the initialization processor 220 of controller 115. In yet another implementation, controller 110 is randomly designated as master controller 110 once communication has been established between the initialization processors 220 in controllers 110 and 115. After a controller has been designated as the master controller 110 within domain 100, all other controllers 115 and 120 default to a secondary controller designation.

The exemplary implementation depicted in FIG. 1 demonstrates that a communication channel between two network nodes may not be direct. For example, switch 140 is indirectly connected to secondary controller 115, master controller 110, and secondary controller 115. One network route connecting switch 140 and secondary controller 115 uses IB hardware link 157 to connect switch 140 to switch 135, and IB hardware link 151 to connect switch 135 to secondary controller 115.

The systems and methods described herein allow indirect communication of control and data information in domain 100. In FIG. 1, the three controllers 110, 115, and 120, and three switches 130, 135, and 140, use eight in-band links 150-157. In contrast, the same number of network nodes, when connected using conventional means, may employ direct and dedicated control links between each controller and each network node, and require up to eighteen data and control links. A typical network domain may include tens or hundreds of network nodes similar in form and functionality to network switches 130, 135, and 140, and the systems and methods described herein may result in significant savings in terms of the cost of network link hardware used to implement control and data connectivity.

Figure 2:
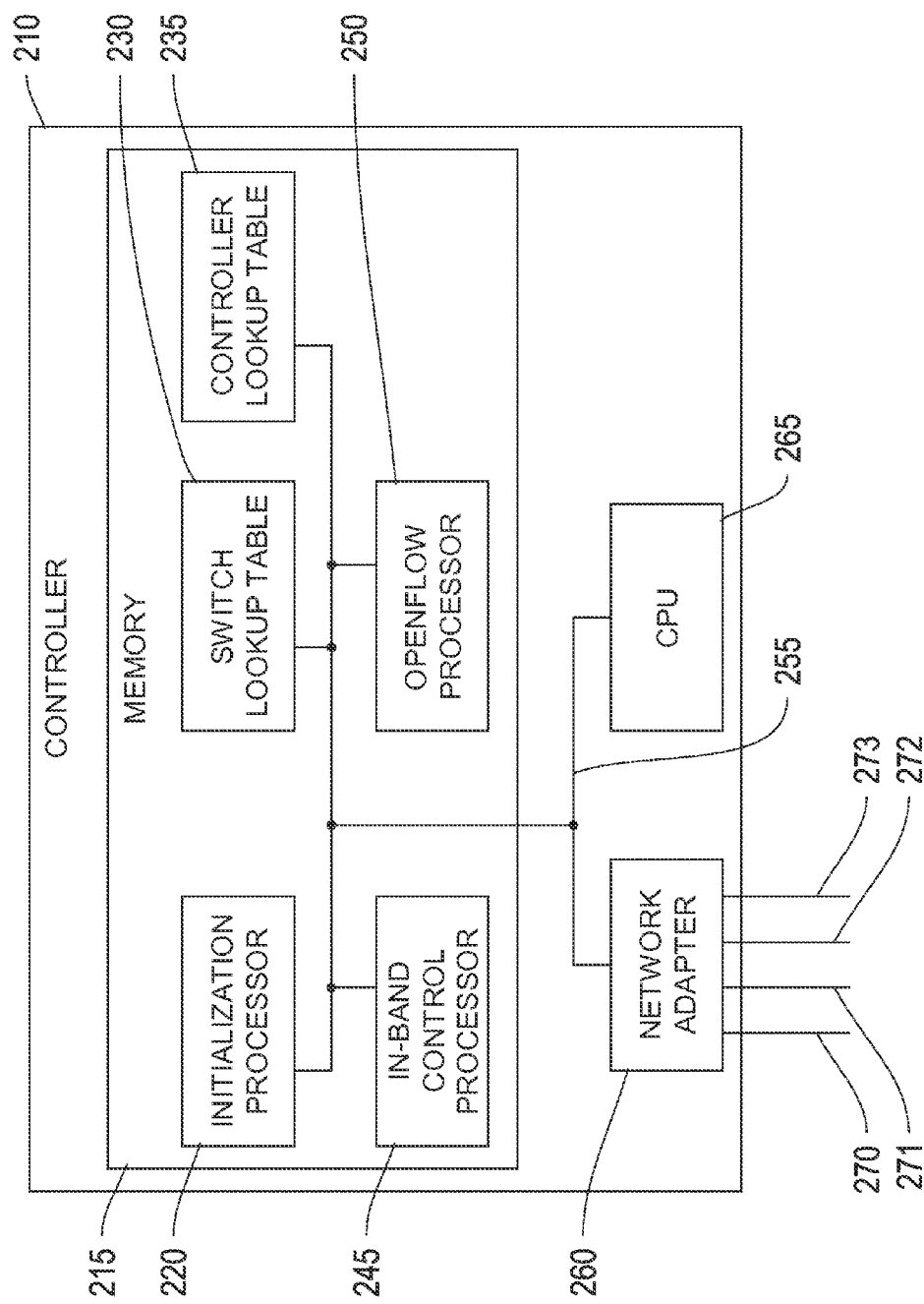
FIG. 2 is a schematic block diagram of a controller.

FIG. 2 is a schematic block diagram of a controller 210. Controller 210 is adapted to reduce the number of network hardware links used to connect network nodes in a centrally-controlled network, and includes: a memory 215, an initialization processor 220, a switch lookup table 230, a controller lookup table 235, an in-band control processor 245, an OpenFlow processor 250, a central processing unit (CPU) 265, a data bus 255, and a network adapter 260. Network adapter 260, in this exemplary implementation, is embodied with four hardware interfaces 270-273.

Controller 210 reduces the number of network hardware links in a network domain, such as network domain 100, by carrying out an initialization procedure. The initialization procedure is used to map the network topology of the domain 100 using in-band hardware links (150-157) between nodes 110, 115, 120, 130, 135, and 140.

Controller 210 may be similar to master controller 110, or secondary controllers 115 and 120 from FIG. 1, wherein a controller 210 is designated the master controller 110 or a secondary controller 115 or 120 in accordance with the processes executed by initialization processor 220, as previously described. A master controller is designated once a pair of controllers establishes a communication channel between one another. This communication channel may be referred to as controller-to-controller reachability, and controller-to-controller reachability may be the result of each controller 110, 115 and 120 independently establishing connectivity to one or more switches 130, 135 and 140 in the domain 100.

A controller 210 is essentially a computer, adapted for the purposes of remotely controlling network hardware switches. The controller's actions are governed by a CPU 265, which may represent a plurality of processing cores. The hardware interfaces between the controller 210 and other network nodes are accommodated by the network adapter 260, wherein the network adapter 260 comprises the mechanical, electrical and signaling circuitry to connect the controller 210 to other network nodes. Network adapter 260 may represent a plurality of network adapters, and the four hardware interfaces 270-273 depicted may represent a larger array of interfaces.

Memory 215 comprises storage locations that are addressable by CPU 265 and adapters for storing software program code and data. The memory 215 may comprise a form of random access memory (RAM) that is generally cleared by a power cycle or other reboot operation (e.g., it is a "volatile" memory). In other embodiments, however, the memory 215 may be a non-volatile memory that does not require power to maintain information. The CPU 265 and adapters may, in turn, comprise processing elements and/or logic circuitry configured to execute the software code and manipulate the data stored in the memory 215.

Initialization processor 220 is configured to execute an initialization process. This initialization process is triggered by the receipt of one or more probe packets from one or more unrecognized network nodes in the network domain that includes controller 210. An unrecognized network node is one that does not have an address entry stored in switch lookup table 230 or controller lookup table 235.

Receipt of probe packets allows the initialization processor 220 to map the network topology of the network domain, and to establish communication channels across IB hardware links to the other network nodes, by executing an initialization process. The following description of an initialization process may be executed by one or more controllers in a domain independently, and before or after a master controller has been designated.

Figure 3:
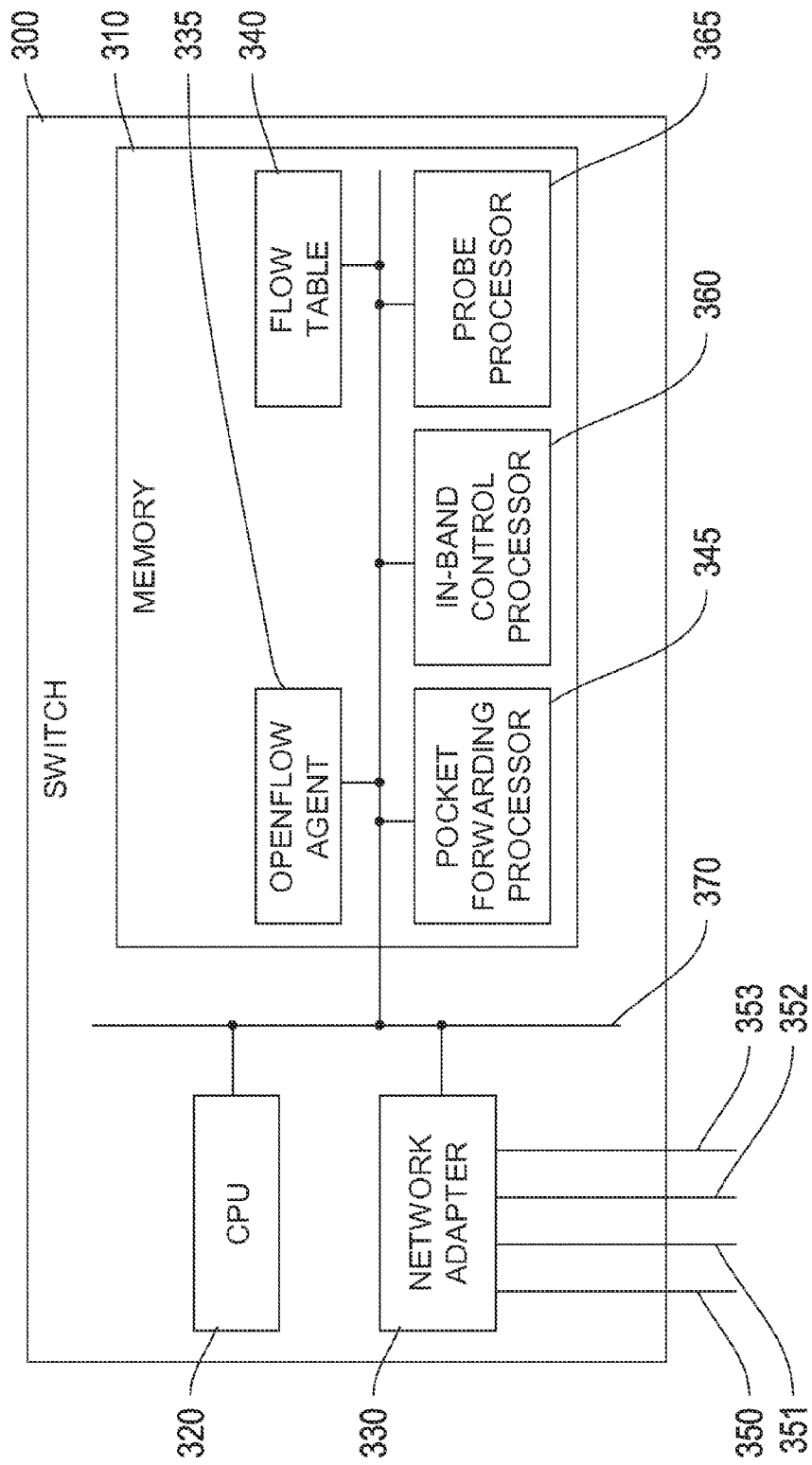
FIG. 3 is a schematic block diagram of a centrally-controlled switch.

In one practice, it is assumed that a switch, when powered on, will periodically send out probe packets on all connected hardware links using a probe processor 365, as described in relation to FIG. 3. The switch probe packets may be sent as a broadcast message, and referred to as broadcast probe packets. In one implementation, these broadcast probe packets are constructed and sent by the probe processor 365 as IP packets addressed to a predefined range of IP addresses. This range of IP addresses encompasses all possible IP addresses within the network domain of which the switch is a part. In another implementation, the broadcast probe packets may be sent as a conventional "limited broadcast" to IPv4 address "255.255.255.255". In yet another implementation, the broadcast probe packets may be sent to IPv6 address "ff02::1", which is a multicast address for IPv6 that is equivalent to a broadcast address for IPv4. The broadcast probe packets contain, among others, the IP address of the sender, such that they advertise the network address of their sender. In another practice, the probe processor 365 may construct and send out switch probe packets as unicast messages.

One or more switch probe packets may be received by the controller 210. The information contained in these probe packets includes a source address, which may be the IP address of the sending switch. This allows the receiving controller 210 to save the addresses of accessible switches in the switch lookup table 230.

The initialization processor 220 in controller 210 also periodically sends probe packets across all connected IB links, identifying the controller 210. Similar to the probe packets sent by the aforementioned switches, the controller probe packets may be sent as a broadcast message to a range of IP addresses, as IPv4 "limited broadcast" messages, as IPv6 special multicast messages, or as unicast messages among others. These methods communicate the probe packets to all destinations within the network domain of which controller 210 is a part, and result in one or more switches and other domain controllers receiving the probe packets, including the address of the sending controller 210.

Controller 210 maintains a list of live controllers in the controller lookup table 235. Live controllers are those identified as actively in-use for network communication, as determined by receipt, by the initialization processor 220, of periodic probe packets from the respective controller listed in the controller lookup table 235. Similarly, controller 210 maintains a switch lookup table 230, which lists all switches known to be reachable in the domain within which controller 210 is positioned. Switches are also added to and retained within the switch lookup table 230 as a result of receipt of probe packets from respective switches in the domain, by initialization processor 220.

The following is a description of the initialization process, as executed by controller 110 from FIG. 1, which has a similar structure to that of controller 210 from FIG. 2. The initialization process is executed by controller 110 in response to receipt of one or more control packets. In the exemplary implementation depicted in FIG. 1, the one or more control packets may be received from switches 130 and 135 on IB links 150 and 151, respectively. Prior to receipt of the one or more control packets, the controller lookup table 235 associated with controller 110 stores the IP address of controller 110 only, and the switch lookup table 230 does not contain any addresses of switches in domain 100.

In response to receipt of the probe packets, controller 110 saves the IP addresses of the sending switches 130 and 135 in the switch lookup table 230. Next, OpenFlow processor 250 in controller 110 may establish a communication channel to a respective OpenFlow Agent (OFA) 335 in a switch (as described in relation to FIG. 3), or to an OpenFlow processor 250 in a respective second controller. The addresses stored in switch lookup table 230 and controller lookup table 235 represent active network nodes known to controller 110 to which communication channels can be established using the OpenFlow processor 250. Additionally, a communication channel may be authenticated by the initialization processor 220 using a cryptographic protocol, such as secure sockets layer (SSL), and communication across the communication channel may be handled using conventional OpenFlow methodology, as recited by OpenFlow.org.

In response to storing a new network node address in switch lookup table 230 or controller lookup table 235, the initialization processor 220 executes a flow-update process. During the flow-update process, the initialization processor 220 communicates with the OpenFlow processor 250 to store updated flows into the flow tables 340 of the switches stored in switch lookup table 230.

A "flow" is a network traffic path with certain characteristics to which a switch responds. These network traffic paths, or flows, include, among others: (i) a specific transmission control protocol (TCP) connection, (ii) all packets from a particular MAC address or IP address, (iii) all packets with the same VLAN tag, (iv) all packets from a particular same switch port, or (v) all packets matching a specific header. Flows are described in greater depth by McKeown et al., OpenFlow: Enabling Innovation in Campus Networks (www.openflow.org, March 2008).

During a flow-update, the initialization processor 220 installs a flow entry in the flow table 340 of a switch, wherein the flow entry includes a flow leading towards each controller in the controller lookup table 235. As a result, the switch can relay network traffic to any controller known to the controller 110 performing the flow-update.

At this point in the description of an exemplary initialization process for controller 110 from FIG. 1, controller 110 has established communication channels to switches 130 and 135.

In response to switch 130 receiving a probe packet from controller 115, the initialization process executes the following steps. Switch 130 does not have a flow entry stored in its flow table 340 that associates a response with packets received from the address of controller 115. By default, the OpenFlow protocol of OFA 335 will instruct a switch, such as switch 130, to pass an unrecognized packet to one or more of its centralized controllers. In this instance, switch 130 has a flow entry stored in its flow table 340 representing a communication channel to controller 110, therefore switch 130 passes the packet to controller 110. Controller 110 does not recognize the address associated with controller 115, as stored in the probe packet, since there is no reference to controller 115 in the controller lookup table 235. Controller 110 adds controller 115 to the controller lookup table 235, and performs a flow-update, using the initialization processor 220 in communication with OpenFlow processor 250, as described before. This same sequence repeats if switch 130, or 135, receives probe packets from controller 120.

Controller 110 also records the time since receipt of the last probe packet from each controller and each switch in its controller lookup table 235 and switch lookup table 230, respectively. After a specified time lapse without receiving a communication from a respective controller or switch, the respective controller or switch is assumed to be inactive in ongoing network communication. This inactive controller or switch is removed from the controller lookup table 235 or switch lookup table 230, and a flow-update is performed.

Having established communication channels to directly-connected switches 130 and 135, controller 110 can establish communication channels to indirectly-connected switches one more hop removed from itself, such as switch 140. A "hop" refers to a link between two network nodes. For example, link 156 represents a hop between switch 130 and switch 140.

In order to improve fault-tolerance, a flow-update may optionally install multiple different network paths towards a controller in the flow table 340 of a switch. If one path fails in an attempt to communicate with an associated controller, a switch will automatically attempt to use one of the other stored paths.

In certain implementations, a controller 210 includes an in-band control processor 245. An in-band control processor 245 may be used to combine control and data information on a common physical channel, or link. The in-band control processor 245 may be used to identify an incoming packet as a data packet or a control packet, and to insert a control packet into a data packet stream, wherein a stream is a series of data packets. If a packet is identified as a control packet, the in-band control processor 245 passes it to the initialization processor 220.

The in-band control processor 245 may identify packets by executing a packet recognition process. In one implementation, this packet recognition process reads the packet header, wherein the packet header will have distinct type of service (ToS) bits identifying the packet as data or control information. The in-band control processor 245 may also distinguish between data and control packets by sending control packets between two specific TCP port numbers on the sender and recipient network nodes.

The initialization process, upon establishing connectivity between the two controllers, may designate one as a master controller, according to designation policies previously described. The designation of a controller is stored by initialization processor 220 in memory 215, and with regard to FIG. 1, controller 110 is designated master controller 110, and controllers 115 and 120 default to secondary controllers. If, however, further controllers are discovered in domain 100, or if controller 110 fails, this designation may be updated.

OpenFlow processor 250 includes the OpenFlow protocol for centralized control of a plurality of network switches, as recited by OpenFlow.org. Using the OpenFlow processor 250, the controller 210 can remotely program switch forwarding tables, send packets on any switch port, and receive packets from any switch port, among other things.

The probe packets, constructed by a probe processor 365 in a switch 300, may also include a list of network destinations reachable from the switch 300. After controller 210 sets up a communication channel to a switch 300 from which one or more probe packets was received, it may read this network destination information, and store it in a global routing table in OpenFlow processor 250. Using this global routing table, OpenFlow processor 250 can save updated flows to a flow table 340 on a switch 300, and execute processes to make routing decisions in response to a switch 300 passing a packet to controller 210 if it does not have a flow entry associated with packets of that same type stored in its flow table 340.

In one implementation, master controller 110 can control all network devices in domain 100, such as switches 130, 135 and 140, and secondary controllers 115 and 120. Domain 100 may form part of a distributed routing protocol, such that a network device in another domain (not shown) can communicate with any network device (switches 130, 135 and 140, and secondary controllers 115 and 120) in domain 100 through master controller 110. The master controller 110 allows domain 100 to have the behavior of a single router upon connection to another domain, such that packets can be sent to master controller 110 without having to consider interconnections between the network nodes (switches 130, 135, 140, and secondary controllers 115 and 120) in domain 100.

FIG. 3 is a schematic block diagram of a switch 300. In particular, FIG. 3 depicts a switch 300 that may be used in a centrally-controlled network, and includes a memory 310, a CPU 320, a network adapter 330 with four network hardware interfaces 350-353, an OpenFlow agent 335, a flow table 340, a packet forwarding processor 345, an in-band control processor 360, and a probe processor 365, all linked by data bus 370.

Switch 300 is similar to switches 130, 135, and 140 from FIG. 1, and configured to reduce dedicated hardware links in a network domain, such as domain 100. Dedicated hardware links are those that function to carry control information directly to the switch 300, and switch 300 enables a reduction in these dedicated hardware links by being able to distinguish between data packets and control packets sent on a common hardware link through a network adapter.

A switch 300 is essentially a computer, adapted to transmit data between client computers in a network. The switch's 300 actions are governed by a CPU 320, which may represent a plurality of processing cores. The hardware interfaces between the switch 300 and other nodes are accommodated by the network adapter 330, where a network adapter 330 comprises the mechanical, electrical and signaling circuitry to connect the switch 300 to other network nodes. Network adapter 330 may represent a plurality of network adapters, and the four hardware interfaces 350-353 depicted may represent a larger array of interfaces, where an interface (350-353) connects to an in-band hardware link.

Memory 310 comprises storage locations that are addressable by CPU 320 and adapters for storing software program code and data. The memory 310 may comprise a form of random access memory (RAM) that is generally cleared by a power cycle or other reboot operation (e.g., it is a "volatile" memory). In other embodiments, however, the memory 310 may be a non-volatile memory that does not require power to maintain information. The CPU 320 and adapters may, in turn, comprise processing elements and/or logic circuitry configured to execute the software code and manipulate the data stored in the memory 310.

OpenFlow agent 335 replaces an on-switch control plane, and allows for communication between the switch 300 and a controller, such as controller 210. On-switch decisions as to how to handle a given data flow are made in consultation with the flow table 340, where the flow table 340 stores flow entries, which associate a flow with an action. There are three basic actions that a switch adhering to the OpenFlow protocol must support, as recited by McKeown et al., OpenFlow: Enabling Innovation in Campus Networks (openflow.org, March 2008), and which includes: (1) Forwarding a flow's packets to a given port, or ports. (2) Encapsulating and forwarding a flow's packets to a controller. Typically this is used for the first packet in a new flow to allow the controller, such as controller 210, to decide if the flow should be added to the flow table 340. (3) Dropping a flow's packets.

Upon instruction from the controller 210, a new entry can be made in the flow table 340, which associates an action to be carried out by switch 300 with a given flow. More particularly, a flow entry in the flow table 340 includes three fields: (1) a packet header that defines the flow, (2) an action to be carried out on the packets that make up a flow, and (3) statistics that keep track of the number of packets and bytes for each flow, and the time since the last packet matched the stored flow. This time can be used to remove inactive flows from flow table 340.

Switch 300 has an in-band control processor 360 which allows it to identify an incoming packet as a data packet or an information packet by looking at the packet header. The packet header will have distinct type of service (ToS) bits identifying the packet as data or control information. Alternatively, the in-band control processor 360 may distinguish between data and control packets by sending control packets between two specific TCP port numbers on the sender and recipient network nodes.

Switch 300 has a probe processor 365, which will, when switch 300 is powered-on and physically connected by a hardware link to another network node, periodically send out probe packets on all connected hardware links identifying itself, and wherein the identification may be in the form of the IP address associated with the switch 300. These probe packets are used in the initialization process carried out by a controller 210, and described in relation to FIG. 2.

A packet, arriving at an interface, such as interface 350 of switch 300, is received by the in-band control processor 360. It is this in-band control processor 360 that allows the switch 300 to be indirectly connected to controller 210, and use a common hardware link for data and control information. The in-band control processor 360 checks the packet header to determine the packet type, wherein if the packet is a control packet, it is passed to the OpenFlow agent 335, and the OpenFlow agent 335 interprets the control information within the packet.

If a packet is identified as a data packet by the in-band processor 360, it is passed to the packet forwarding processor 345. In response, the packet forwarding processor reads the destination address of the data packet. If there is a cached flow entry corresponding to the destination address of the data packet in the flow table 340 of the switch 300, then the forwarding rules associated with that flow entry are carried out on the packet. If, however, no flow entry exists for the packet received, an exception is thrown, and the packet forwarding processor 345 uses the OpenFlow agent 335 to request information from controller 210 as to how to process packets of this new type. The controller 210 returns a forwarding decision to the switch 300, which is carried out on the packet by the packet forwarding processor 345, and cached in the flow table 340 for future packets of that same type.

FIGS. 4A-4C are pictorial representations of the establishment of inter-controller reachability. The processes related to these pictorial representations are carried out by an initialization processor, such as initialization processor 220 from controller 210 in FIG. 2, wherein the initialization processor 220 is used to establish communication with other controllers in a network domain using in-band hardware links only. Once the initialization process, as described with reference to FIG. 2 for controller 110, has been carried out by all controllers in a domain, controller-to-controller, or inter-controller reachability is established.

FIG. 4A depicts two controllers, 405 and 410, and two switches 415, and 420. More particularly, FIG. 4A represents the independent initialization process by controller 405, which sets up communication channels 430 and 431 from controller 405 to switch 415, which is directly-connected to controller 405, and to switch 420, which is one hop away from controller 405. Communication channels 430 and 431 use in-band links. Similarly, FIG. 4B represents the independent initialization process by controller 410 to set up communication channels 431 and 432, through in-band links, from controller 410 to switches 415 and 420.

FIG. 4C depicts the resultant connectivity in the network of switches 415 and 420, and controllers 405 and 410 after both controllers 405 and 410 have executed independent initialization processes. Communication channels 430, 431, and 432 communicate data and control information from all domain switches, 415 and 420, to all domain controllers, 405 and 410. Controller-to-controller communication is indirect, and through communication channels 430, 431, and 432. Communication channels 430, 431, and 432 allow probe packets to be exchanged between controllers 405 and 410, and the controller lookup table 235 in a given controller 405 and 410 will include all domain controllers 405 and 410.

Figure 5:
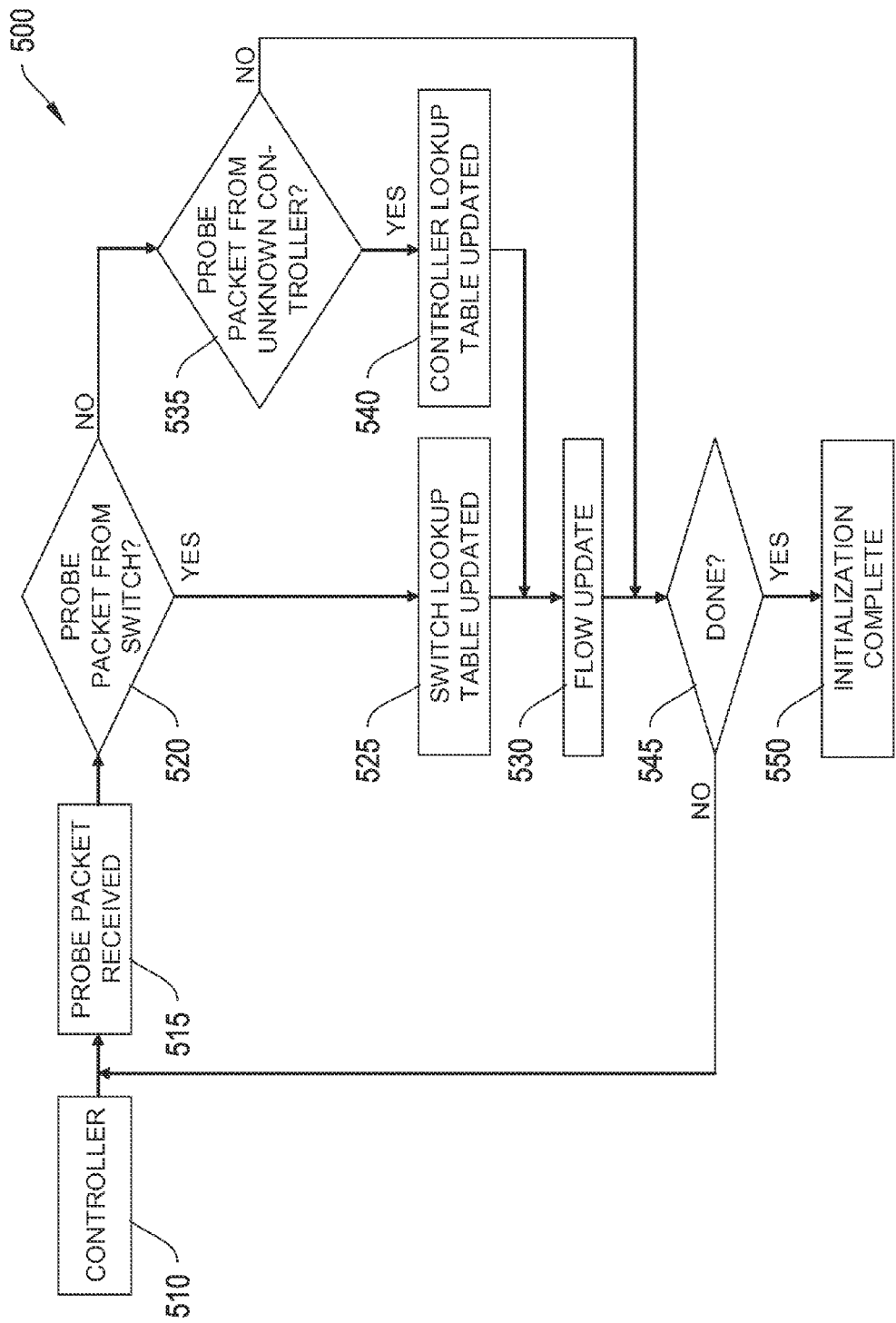
FIG. 5 is a flow chart diagram of a network initialization process.

FIG. 5 is a flow chart diagram of a network initialization process 500. The initialization process 500 is carried out by a controller, such as controller 210 from FIG. 2, and starts at step 510 at a controller, before inter-controller reachability has been established and before a master controller has been designated. The process proceeds to step 515 where the controller receives a probe packet from an unrecognized sender. In response, and at step 520, the initialization processor in the controller determines if the probe packet is from a switch. If so, the process proceeds to step 525, and the controller updates its switch lookup table. If the probe packet is not from a switch, then the process proceeds to step 535, where the initialization processor determines whether the probe is from another controller. If the probe is from another controller, the controller in receipt of the probe packet updates its controller lookup table at step 540. Step 530 is a flow update, as described in relation to FIG. 2 before.

Step 545 is a check to determine if the initialization process is complete, wherein a determination may be made if no probe packets from unrecognized sources arrive at the controller within a specified timeout period. If an unrecognized probe packet is received before the timeout period has elapsed, the process proceeds to step 515, and repeats as before. It is noted, however, that the initialization process may complete at step 550, but subsequently the controller may receive an unrecognized probe packet, such as when new hardware is added to a network. In such instances, the initialization processor initiates process 500, as before.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include, without limitation, device drivers, operating systems, and user applications. Ultimately, such computer readable media further includes software instructions for performing embodiments described herein. Included in the programming (software) of the general-purpose/specialized computer or microprocessor are software modules for implementing some embodiments.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A network system, comprising:
   a network domain, having a first centralized controller controlling a first network switch and a second network switch;
   a plurality of in-band network hardware links including at least (A) a first in-band hardware link between the first centralized controller and the first network switch, and (B) a second in-band hardware link between the first network switch and the second network switch;
   a probe processor configured to:
      construct a first network node probe packet advertising a first network switch network address of the first network switch,
      construct a second network node probe packet advertising a second network switch network address of the second network switch, and
      transmit the first and second network node probe packets through one or more of the plurality of in-band network hardware links; and
   a first initialization processor in the first centralized controller, configured to:
      receive one or more of the network node probe packets, and
      establish, in response to receiving the second network node probe packet, connectivity between the first centralized controller and the second network switch, through the second in-band hardware link, for communication of data information and control information between the first centralized controller and the second network switch.

2. The network system according to claim 1, further comprising:
   a second centralized controller having a second initialization processor, the second centralized controller indirectly connected to the first centralized controller via the first or the second network switch by one or more hardware links in the plurality of in-band network hardware links, the second centralized controller controlling one or more of the first or the second network switches, wherein the first and the second initialization processors are further configured to:
      (a) construct one or more controller probe packets that advertise the network address of the first or the second centralized controller,
      (b) transmit the probe packets through one or more of the plurality of in-band network hardware links,
      (c) receive one or more controller probe packets, and
      (d) establish, in response to receiving one or more controller probe packets, connectivity to the first or the second centralized controller identified by the one or more controller probe packets, such that the plurality of in-band network hardware links can be used for communication of data information and control information between the first and the second centralized controllers.

3. The network system according to claim 2, further comprising:
   a master controller controlling a secondary controller and the first and the second network switches, wherein the master controller is one of the first centralized controller or the second centralized controller.

4. The network system according to claim 3, wherein the master controller is designated from the first and the second centralized controllers, and the non-designated of the first and the second centralized controllers is the secondary controller.

5. The network system according to claim 3, wherein one of the first or the second centralized controllers is designated by default settings to be the master controller, and the other is designated by default settings to be the secondary controller.

6. The network system according to claim 2, further comprising:
   a centralized controller lookup table in the second centralized controller storing references to centralized controllers to which connectivity has been established in the network domain.

7. The network system according to claim 1, further comprising:
   an in-band control processor in the first network switch or in the second network switch, the in-band control processor configured to distinguish between data and control information received on an in-band network hardware link.

8. The network system according to claim 7, wherein the in-band control processor is configured to distinguish between data information and control information received on an in-band hardware link using type of service (ToS) bits in a header of a packet carrying the control or data information.

9. The network system according to claim 7, wherein the in-band control processor is configured to distinguish between data information and control information received on an in-band network hardware link by receiving control information at a specific TCP port number.

10. The network system according to claim 1, further comprising:
    a network node lookup table in the first centralized controller storing references to one or more network switches to which connectivity has been established in the network domain.

11. The network system according to claim 1, wherein one or more of the first and the second network switches are network routers.

12. The network system according to claim 1, wherein the first initialization processor is configured to authenticate an established connection using a cryptographic protocol.

13. The network system according to claim 12, wherein the cryptographic protocol is a secure sockets layer (SSL).

14. The network system according to claim 1, wherein at least one of the network node probe packets includes a list of network destinations reachable from one of the first or the second network switch.

15. A method comprising:
    grouping a first centralized controller, a first network switch, and a second network switch into a network domain;
    controlling one or more of the first and the second network switches from the first centralized controller;
    linking, using a plurality of in-band network hardware links including a first in-band network hardware link and a second in-band network hardware link, the first centralized controller and the first network switch using at least the first in-band hardware link, and linking the first network switch and the second network switch using at least the second in-band network hardware link between the first network switch and the second network switch;

constructing, using a probe processor, one or more first network node probe packets that advertise the network address of the first network switch and one or more second network node probe packets that advertise the network address of the second network switch;

transmitting, using the probe processor, the first and second network node probe packets through one or more of the plurality of in-band network hardware links;

receiving, by a first initialization processor in the first centralized controller, one or more of the first or second network node probe packets; and establishing, by the first initialization processor in response to receiving one or more of the first or second network node probe packets, connectivity between the first centralized controller and the second network switch, through the second in-band hardware link, for communication of data information and control information between the first centralized controller and the second network switch.

16. The method according to claim 15, further comprising:
controlling one or more of the first or the second network switches by a second centralized controller having a second initialization processor, the second centralized controller indirectly connected to the first centralized controller via the first or the second network switch by one or more hardware links in the plurality of in-band network hardware links;

constructing, by the first or the second initialization processor, one or more controller probe packets that advertise the network address of the first or the second centralized controller;

transmitting, by the first or the second initialization processors, the probe packets through one or more of the plurality of in-band network hardware links;

receiving, by the first or the second initialization processors, one or more controller probe packets; and establishing, by the first or the second initialization processors in response to receiving one or more controller probe packets, connectivity to the first or the second centralized controller identified by the one or more controller probe packets, such that the plurality of in-band network hardware links can be used for communication of data information and control information between the first and the second centralized controllers.

17. The method according to claim 16, further comprising:
controlling a secondary controller and the first and the second network switches by a master controller, wherein the master controller is one of the first centralized controller or the second centralized controller.

18. The method according to claim 17, further comprising:
designating the master controller from the first and the second centralized controllers by default settings.

19. The method according to claim 17, further comprising:
receiving, by the master controller, packets from a second network domain; and communicating, by the master controller, the packets to the first network switch or the second network switch.

20. The method according to claim 15, further comprising:
distinguishing, using an in-band control processor, between data and control information received on an in-band network hardware link.

21. The method according to claim 20 further comprising:
distinguishing, by the in-band control processor, between data information and control information received on an in-band network hardware link by the in-band control processor using type of service (ToS) bits in a header of a packet carrying the control or data information.

22. The method according to claim 20, further comprising:
distinguishing, by the in-band control processor, between data information and control information received on an in-band hardware link by receiving control information at a specific TCP port number.

23. The method according to claim 15, further comprising:
storing a reference to one or more of the first and the second network switches to which connectivity has been established in a network node lookup table in the first centralized controller.

24. The method according to claim 15, further comprising:
storing a reference to the first or the second centralized controller to which connectivity has been established in a centralized controller lookup table in the first and the second centralized controllers.

25. The method according to claim 15, wherein one or more of the first and the second network switches are network routers.

26. The method according to claim 15, further comprising:
authenticating an established connection, by the first initialization processor, using a cryptographic protocol.

27. The method according to claim 26, wherein the cryptographic protocol is secure sockets layer (SSL).

28. The method according to claim 15, wherein at least one of the network node probe packets includes a list of network destinations reachable from one of the first or the second network switch.

* * * * *